US005463209A

United States Patent [19]

Figh et al.

[11] Patent Number: 5,463,209

[45] Date of Patent: Oct. 31, 1995

[54] POINT-OF-SALE PRODUCT INFORMATION DISSEMINATION ARRANGEMENT AND METHOD

[75] Inventors: Jack Figh, Guttenberg; Robert V. Cuddihy, Jr., Basking Ridge, both of N.J.

[73] Assignee: HMG Worldwide In-Store Marketing, Inc., New York, N.Y.

[21] Appl. No.: 384,607

[22] Filed: Feb. 3, 1995

Related U.S. Application Data

[63] Continuation of Ser. No. 158,517, Nov. 29, 1993, abandoned.

[51] Int. Cl.$^6$ ..................... G06K 15/00

[52] U.S. Cl. ..................... 235/383; 235/381; 235/472; 235/487

[58] Field of Search ..................... 235/381, 383, 235/487, 472; 364/401

[56] References Cited

U.S. PATENT DOCUMENTS

| | | | |
|---|---|---|---|
| 4,833,308 | 5/1989 | Humble | 235/383 |
| 4,949,256 | 8/1990 | Humble | 235/487 |

FOREIGN PATENT DOCUMENTS

| | | |
|---|---|---|
| 0139876 | 5/1985 | European Pat. Off. . |

*Primary Examiner*—Harold Pitts

*Attorney, Agent, or Firm*—Cohen, Pontani, Lieberman & Pavane

[57] ABSTRACT

An arrangement for providing any customer present at a vending location at which a group of products is offered for sale with information about any member of such group includes an audiovisual device and a customer-initiated request entry device both situated at the vending location. Data representative of audiovisual information segments pertaining to the individual products of the group are stored in separate portions of a data storage medium and are retrieved from there and used to drive the audiovisual device to present the segment that corresponds to the request. When the products have optically distinguishable markings that uniquely identify them by product type associated therewith, the entering means may include an optical scanner arranged in such a manner as to enable any customer to bring a chosen marking and the optical scanner in relative positions in which the optical scanner scans the chosen marking and generates the addressing signal.

5 Claims, 1 Drawing Sheet

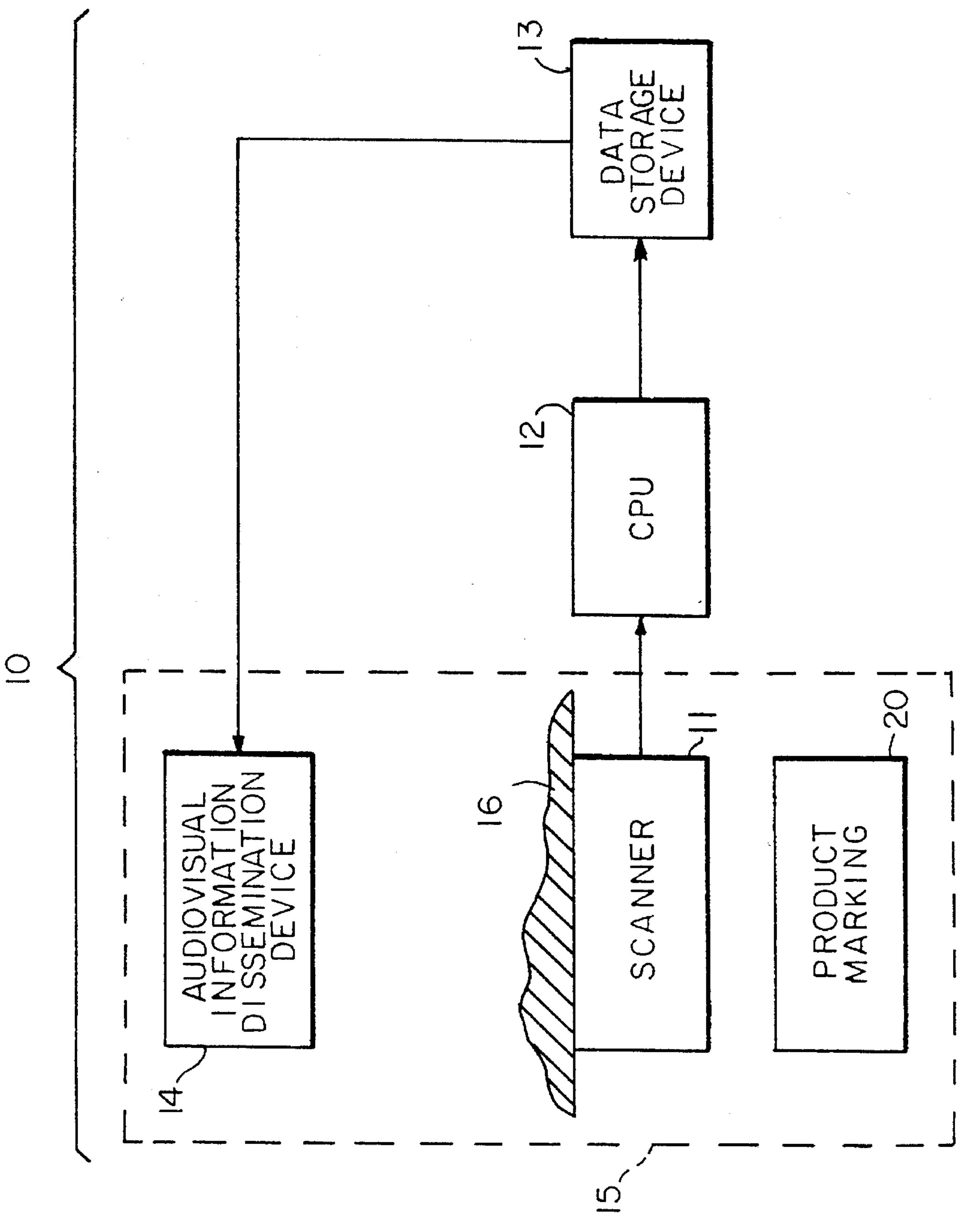
10
13
DATA STORAGE DEVICE
12
CPU
14
AUDIOVISUAL INFORMATION DISSEMINATION DEVICE
16
11
SCANNER
20
PRODUCT MARKING
15

POINT-OF-SALE PRODUCT INFORMATION DISSEMINATION ARRANGEMENT AND METHOD

This is a continuation of application Ser. No. 08/158,517, filed Nov. 29, 1993, now abandoned.

FIELD OF THE INVENTION

The present invention relates to information distribution in general, and more particularly to a point-of-sale product information dissemination system and method.

BACKGROUND OF THE INVENTION

Customer awareness of product or service availability, brand name recognition and/or perception of usefulness of particular products or services or of advantages to be gained from obtaining or using them, have historically been recognized as important factors in the decision-making process concerning the purchase of such products or services. As a consequence, many systems and approaches have already been proposed for exposing prospective customers to such product or service oriented information.

Traditionally, such information usually took the form of advertisement extolling the virtues or advantages of one brand of product or service over a competing brand. However, since the advent of the information age, customers are becoming more and more sophisticated and demanding, especially as far as the information contents of the messages directed at them by the product or service providers is concerned.

In recognition of this emerging trend, some attempts have already been made to go beyond brand advertising as such and into an area where the prospective customer is provided with information that, while still presented in connection with a particular brand, actually educates the customer about the properties of products being promoted, or ways of using them, and/or elucidates the customer on other potentially useful aspects of such products or services.

One example of this approach is a so-called "informercial", which is, for instance, a television program of an extended length (such as half an hour) devoted to a single product or service (or to just a few, usually related, products or services) that is produced by or for, and the air time of which is paid for by, an offeror of such product or service, and that presents information of the above character relating thereto. While this approach is gaining in popularity, its appeal may be limited by its substantial cost in relation to the rather limited size of the audience, and particularly by the fact that, considering the home environment in which the program is being viewed, the viewer is tempted to postpone ordering the product or service and eventually forgets to do so.

Another proposed approach that, at least on the surface, shows more promise involves the placement of a video display apparatus at a strategically selected store location, usually but not necessarily close to the product to be promoted, and presentation thereon of information of the above character concerning such product. While this approach provides the potential customer with relevant information right at a location at which the product in question is available for sale, it still leaves much to be desired. For one, the choice of the product being presented is that of the store and not of the customer. Secondly, the informational program is usually being presented continuously, so to speak in an endless loop, which means that the chance that the potential buyer will see the program in the proper sequence from the beginning to the end is very low. This, of course, detracts from the appeal of such presentation. Last but not least, the presentation is available for viewing to anyone in the vicinity of the display apparatus, thus making viewing in private, which the customer may prefer, impossible.

OBJECTS OF THE INVENTION

Accordingly, it is an object of the present invention to avoid the disadvantages of the prior art.

More particularly, it is an object of the present invention to devise an information dissemination arrangement that is especially well suited for use in point-of-sale product-specific information distribution applications.

Still another object of the present invention is to construct the arrangement of the type here under consideration in such a manner as to enable any customer to obtain useful information concerning a product of interest at a vending location prior to purchasing and/or trying the same.

It is yet another object of the invention to propose an arrangement of the above type that is relatively simple in construction, inexpensive to manufacture, easy to use, and reliable in operation.

A concomitant object of the present invention is to provide a method of presenting the customer, in response to a request therefor, with only that audiovisual information that is specifically directed to the product chosen by the customer from a group of products as to which such information is available at the vending location.

SUMMARY OF THE INVENTION

In keeping with these objects and others that will become apparent hereafter, one feature of the present invention resides in an arrangement for providing any customer present at a vending location at which a group of products is offered for sale with information about any member of such group in response to a customer-initiated request for such information. This arrangement includes means for presenting at the vending location audiovisual information as dictated by driving signals. In accordance with the invention, the driving signals are generated by generating means that includes data storage means including a storage medium having a plurality of individual portions each dedicated to storing product-related data representative of an audiovisual information segment relating to a particular one of the product group members, means for retrieving the data from the storage medium and for issuing the driving signals as representations of such retrieved data, and means for directing the retrieving means to any of the portions of the data storage medium for retrieval of the product-related data therefrom. The thus obtained driving signals are then furnished to the presenting means. The arrangement of the present invention further includes means for controlling at least the generating means, such generating means including means for entering the customer-initiated request at the vending location; means for producing an addressing signal indicative of that of the portions of the data storage medium that corresponds to the request, and means for causing the directing means to direct the retrieving means to that of the portions of the data storage medium that is identified by the addressing signal.

A particular advantage of the information dissemination arrangement as described so far is that it enables a prospective purchaser of a product to obtain relevant information concerning the product right where the product is being sold, that is, in a situation where the customer may consider purchasing the product but may entertain some doubts about the utility or properties of such product, about the way(s) in which the product can be used, etc. Thus, the arrangement of the present invention provides the vendor with an opportunity to overcome such doubts by answering the questions that are anticipated to be raised in the audiovisual information segment devoted to the product in question.

A particularly simple and otherwise advantageous implementation of the arrangement of the present invention is also proposed for use in a situation where each of the products in the group has an optically distinguishable marking that uniquely identifies such product by type associated therewith. Under these circumstances, the entering means advantageously includes an optical scanner arranged at the vending location in such a manner as to enable any customer intending to initiate the request for a particular product-related information to put a chosen one of the markings and the optical scanner in positions with respect to one another in which the optical scanner scans the chosen marking and generates the addressing signal.

The novel features which are considered as characteristic of the invention are set forth in particular in the appended claims. The improved information dissemination arrangement itself, however, both as to its construction and the method of its operation, together with additional features and advantages thereof, will be best understood upon perusal of the following detailed description of certain specific embodiments with reference to the accompanying drawing.

BRIEF DESCRIPTION OF THE DRAWING

The sole FIGURE of the drawing is a block diagram of an information dissemination arrangement embodying the present invention.

DETAILED DESCRIPTION OF THE PREFERRED EMBODIMENTS

Referring now to the sole FIGURE of the drawing in detail, it may be seen that the reference numeral 10 has been used therein to generally identify an arrangement constructed in accordance with the present invention for disseminating customer-requested product-related information at a vending location, whereas the reference number 20 identifies a carrier of an optically distinguishable marking that uniquely identifies a type of a product that is being offered for sale at a vending location. To give an example, the carrier 20 may be a product label affixed to the respective product and carrying the so-called SKU code (also referred to as bar code) assigned to the particular type of product. However, it should be realized that the carrier 20 and/or the marking carried thereby may be of a different character, so long as it is assured that the marking can be easily and reliably correlated with the product type to which it pertains and is optically distinguishable from the markings associated with all other product types.

The information dissemination arrangement 10 includes several constituent components at least the most important ones of which are depicted in the drawing. More particularly, such main components include an information request entry device 11, an information processing device 12, a data storage device 13, and a product information presentation device 14. The above components are interconnected with one another in the manner illustrated in the drawing by respective information transfer lines or busses that carry data or other signals at least in one direction between the respective components 11 to 14 connected thereby.

As indicated in dash lines in the drawing, at least the information request entry device 11 and the product information presentation device 14 of the arrangement 10 are situated, in accordance with the present invention, at the aforementioned vending location at which the illustrated marking carrier 20 (as well as other identical or similar marking carriers associated with other products of the same type and/or with products of other types) and/or the associated product(s) are located. This vending location, which is identified in the drawing by the reference numeral 15, may be as small as the immediate vicinity of a shelf on which the products in question are being displayed, or as large as an aisle or other section of a store, or even the entire store, depending on the product line, shop owner preferences, equipment availability and cost, and other factors. The only requirement that is to be satisfied in this connection, mainly for customer convenience and thus to increase the probability of use, is that the consumer desiring to obtain information about any particular product can initiate the request for prosecution and follow the presentation without moving from one place to another. Ideally, the request entry device 11 and the marking carrier 20 will be within easy reach distance of one another, and the product information presentation device 14 will be only an easy viewing and/or listening distance away. On the other hand, the components 12 and 13 of the arrangement 10 may, but preferably are not, disposed remotely from the vending location 15, such as in a store manager's office, in a dedicated room in the same building, or at an even more remote location.

Many devices are already known that can be used for the various components 11 to 14 of the arrangement 10. So, for instance, the product information presentation device 14 may be constituted by any commercially available television set or monitor, preferably one equipped with sound producing means to present not only visually perceptible product information but also related audible information. Yet, in some cases, it may be sufficient or even preferred to present the product information to the customer only as sounds, or only as images. If such practice consistently applies to all products as to which information is to be imparted at the particular vending location 15, then the equipment used in the arrangement 10 may be chosen with this in mind, i.e. to have only sound, or only image reproduction capability. In any event, the term "audiovisual" as used throughout this disclosure is intended to embrace information that is presented in the form of sounds, or in the form of images, but not necessarily in both of such forms in all cases. The data storage device 13 may be any currently available video player, laser disk player, ROM disk player, memory chip or the like, preferably such providing for quick and accurate access to and data retrieved from any portion thereof. An appropriately programmed central processing unit (CPU), such as that forming the core of any commercially available computer, may be used for the processing means 12. Last but not least, the product information request entry device 11 is preferably constituted by an optical (laser beam) scanner of the type that can be safely handled by the customer. So, for instance, such optical scanner 11 may be constructed as a hand-held device that can be moved to various sections of the vending location 15 to scan any marking carrier 20 located within or brought into the vending location 15. In a currently preferred alternative, however, the optical scanner 11 would be mounted under, or incorporated in, a store display shelf present at the vending location 15 as schematically indicated in the drawing at 16. In this case, the respective marking carrier 20 and/or the product carrying the same will be brought by the prospective customer to the scanner 11, rather than the other way around. To avoid problems that may arise from imperfect scanner/marking alignment or orientation, the scanner 11 is preferably of the moving light or laser beam type, in which the light or laser beam conducts rapid movement along a predetermined trajectory that is laid out in such a manner that the marking (bar code) will be scanned in the proper sequence while the beam moves in some part of such trajectory, and thus provide the needed information to the associated sensor during such time interval.

Having so described the construction of the arrangement 10 in general terms, its operation as currently contemplated will now be explained in some detail. First of all, it is to be mentioned that the various components 11 to 14 of the arrangement 10, individually or collectively, include certain devices or circuits, whether hard-wired or software-produced, that perform certain functions in ways that are so well known that they need not be described here in detail. Thus, for instance, in the situation described in some detail above, the scanner 11 includes, as is well known, an optical sensor that generates electrical output signals of the same information contents as the bar code when the latter is properly scanned. In this instance, such scanner output signals either constitute addressing signals or are used by the CPU 12, again in a manner that is well known, such as by decoding them such output signals to produce addressing signals identifying the portion of the data storage 13 that contains the data or data string that is representative of the audiovisual information segment pertaining to the product identified by such bar code. On the other hand, the data storage device 13 includes, besides a data storage medium proper, an information retrieval device or head that is movable, again in a conventional way, into alignment with any called-for portion of the memory or data storage medium and is operative for retrieving the data recorded for use in issuing corresponding driving signals. The CPU 12, in turn, includes circuitry that issues control signals that cause the reading head of the device 13 to move to the desired portion of the data storage medium. Also, either the information presentation device 14 (as shown), or the CPU 12 (as shown) includes circuitry that controls the audiovisual reproduction means 14 by issuing the driving signals corresponding to the retrieved data string representative of the product information segment to be presented and to dictate its performance to present the requested segment furnished from the data storage device 13 to such product information presentation device 14. The structures of all such additional circuitry or devices are so well known to those active in this field as not to require any further elaboration here.

While the invention has been illustrated and described as embodied in a particular implementation of a point-of-sale product information dissemination arrangement, it is not intended to be limited to the details shown, since various modifications and structural changes may be made without departing in any way from the spirit of the present invention.

Without further analysis, the foregoing will so fully reveal the present invention that others can, by applying current knowledge, readily adapt it for various applications without omitting features that, from the standpoint of prior art, fairly constitute essential characteristics of the generic and specific aspects of the contribution to the art and, therefore, such adaptations should and are intended to be comprehended within the meaning and range of equivalence of the claims.

What is claimed as new and desired to be protected by Letters Patent is set forth in the appended claims:

1. A product information system for providing any customer present at a point-of-display location, at which a group of products is displayed for sale, with information about a selected product of the group in response to a customer-initiated request, each product in the group having associated therewith an optically distinguishable, product identifying indicia, the system comprising:

data storage means including a storage medium having a plurality of individual portions each dedicated to storing product-related data representative of an audiovisual information segment relating to a particular product of the group;

means for entering the customer-initiated request, including an optical scanner positionable at the point-of-display location in such a manner as to enable any customer intending to initiate a request by positioning the selected product with the indicia in scanning registration therewith, said optical scanner including means for scanning the product identifying indicia, and for producing an addressing signal corresponding to a request for information about the selected product;

means responsive to said addressing signal for retrieving data corresponding to the selected product from said storage medium and for issuing driving signals as representations of such retrieved data; and means for presenting at the point of display location audiovisual information as dictated by driving signals, whereby a customer contemplating the purchase of a selected product may view an audiovisual presentation providing information about that selected product.

2. The system as defined in claim 1, wherein the product-identifying indicia is a UPC code and wherein said optical scanner includes means for decoding a bar code associated with the selected product and for converting the same into said addressing signal.

3. A method for providing any customer present at a point-of-display location, at which a group of products is displayed for sale, with information about a selected product of the group in response to a customer-initiated request, each product in the group having associated therewith an optically distinguishable, product identifying indicia, the method comprising the steps of:

providing an optical scanner at the point-of-display location in such a manner as to enable any customer intending to initiate a request by placing the selected product with the indicia in scanning registration therewith, said optical scanner including means for scanning the product identifying indicia, and for producing an addressing signal corresponding to a request for information about the selected product;

producing, with the optical scanner, said addressing signal;

retrieving, in response to the addressing signal generated during said producing step, data corresponding to the selected product from said storage medium and issuing driving signals as representations of such retrieved data, and displaying, at the point-of-display location, audiovisual information as dictated by the driving signals, whereby a customer contemplating the purchase of a selected product may obtain information concerning that selected product.

4. A product information system for providing any customer present at a point-of-display location, at which a group of products is displayed for sale, with information about a selected product of the group in response to a customer-initiated request, each product in the group having associated therewith an optically distinguishable, product identifying indicia, the system comprising:

means for entering the customer-initiated request, including an optical scanner positionable at the point-of-display location in such a manner as to enable any customer intending to initiate a request by positioning the selected product with the indicia in scanning registration therewith, said optical scanner including means for scanning the product identifying indicia;

data storage means, including a storage medium, for storing product-related data representative of audiovisual information segments corresponding to respective products of the group; and means operatively associated with said data storage means for presenting, at the point-of-display location, at least one audiovisual segment corresponding to the selected product, whereby a customer contemplating the purchase of a selected product may view an audiovisual presentation providing information about that selected product.

5. The system as defined in claim 4, wherein the product-identifying indicia is a UPC code and wherein said optical scanner includes means for decoding a bar code associated with the selected product and for converting the same into said addressing signal.

* * * * *